United States Patent [19]

Gutta

[11] Patent Number: 5,174,622
[45] Date of Patent: Dec. 29, 1992

[54] COMBINATION ROLL CAGE AND COVER FOR ALL-TERRAIN VEHICLES

[76] Inventor: Paul J. Gutta, 38 Linden St., Westover, W. Va. 26505

[21] Appl. No.: 777,915

[22] Filed: Oct. 17, 1991

[51] Int. Cl.⁵ .............................................. B60J 1/06
[52] U.S. Cl. ................................ 296/77.1; 296/78.1; 296/102; 180/210; 280/756
[58] Field of Search ............... 296/77.1, 78.1, 102; 180/210; 280/756

[56] References Cited

U.S. PATENT DOCUMENTS

| | | | |
|---|---|---|---|
| 4,014,589 | 3/1977 | Yerkey | 296/77.1 |
| 4,247,030 | 1/1981 | Amacker | 224/273 |
| 4,277,008 | 7/1981 | McCleary | 224/273 |
| 4,325,448 | 4/1982 | Pivar | 180/210 |
| 4,336,964 | 6/1982 | Pivar | 296/77.1 |
| 4,621,859 | 11/1986 | Spicher | 296/77.1 |
| 4,773,695 | 9/1988 | Jones et al. | 296/77.1 |
| 4,795,205 | 1/1989 | Gerber | 296/77.1 |
| 4,950,017 | 8/1990 | Norton | 296/77.1 |
| 4,973,082 | 11/1990 | Kincheloe | 296/78.1 |

Primary Examiner—Robert R. Song
Attorney, Agent, or Firm—Sherman and Shalloway

[57] ABSTRACT

A combination roll cage and cover removably mounted to all-terrain vehicles providing protection to riders of such vehicles from road hazards, debris and the elements. The apparatus comprises a framework of square steel tubing welded together to form a cage having a front portion and overhead protection over which a weatherproof fabric cover having at least a front mounted window is placeable to form an enclosed cab. The framework is easily attachable to the existing front and rear structures of an all-terrain vehicle so as to cover and enclose the rider's area. The framework is useable with or without the cover for roll over protection and also provides a means to deflect branches and similar hazards away from the rider by virtue of the design of the front portion. At least one embodiment includes a rear mounted carrier rack.

20 Claims, 5 Drawing Sheets

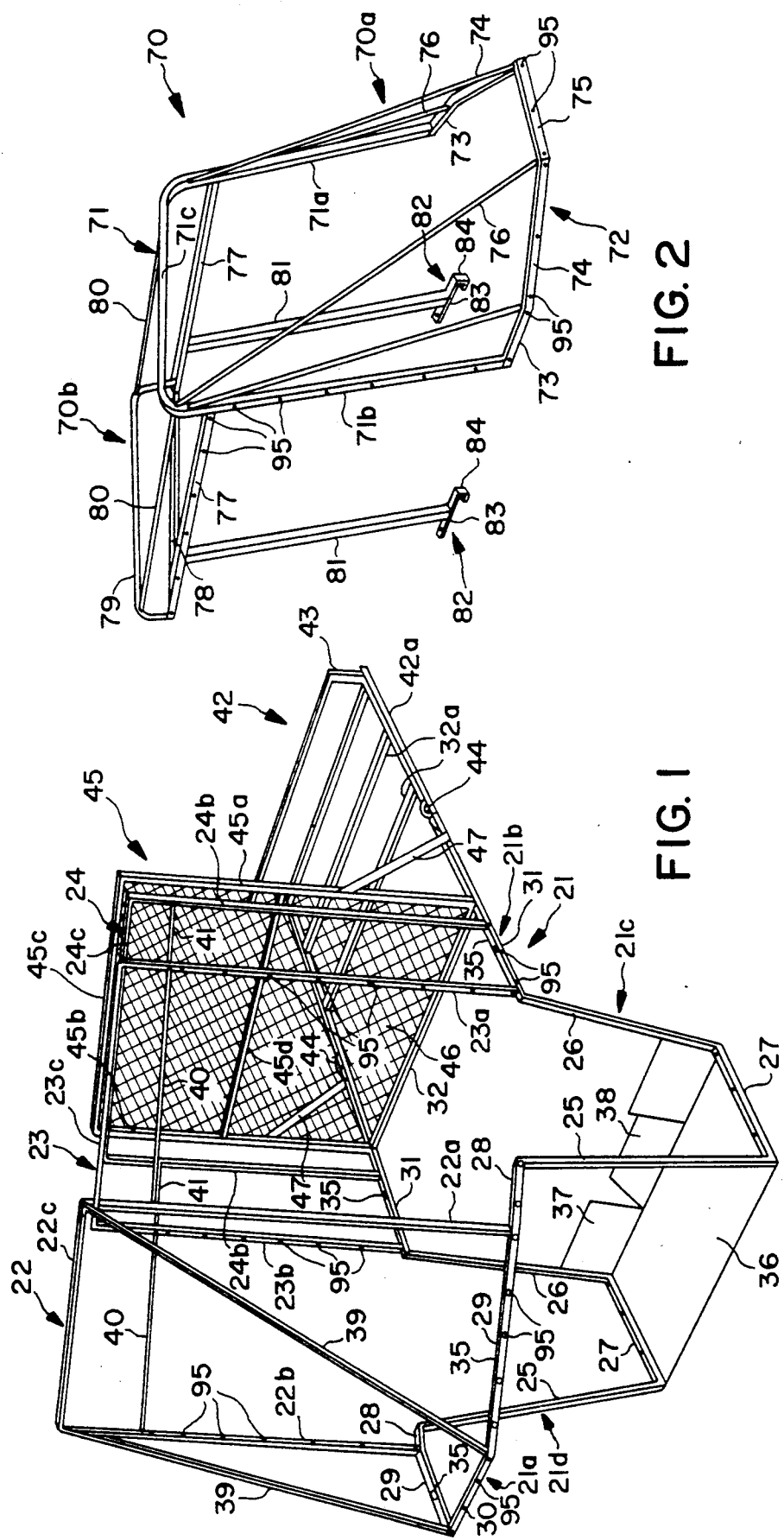

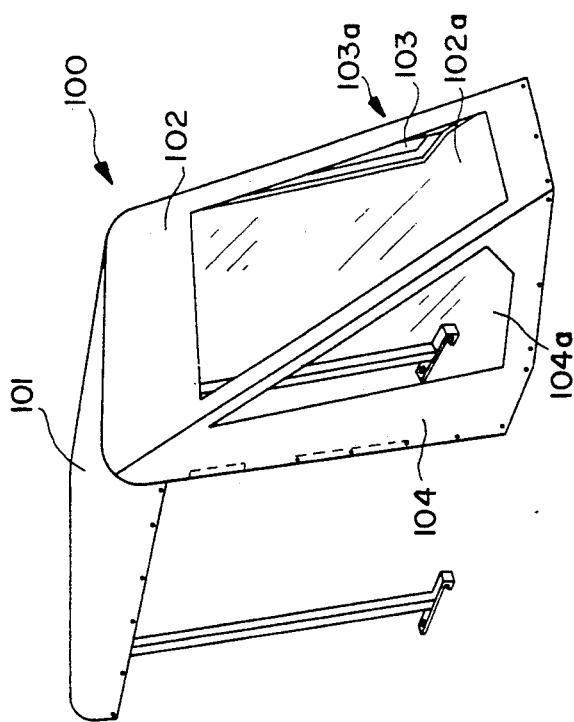
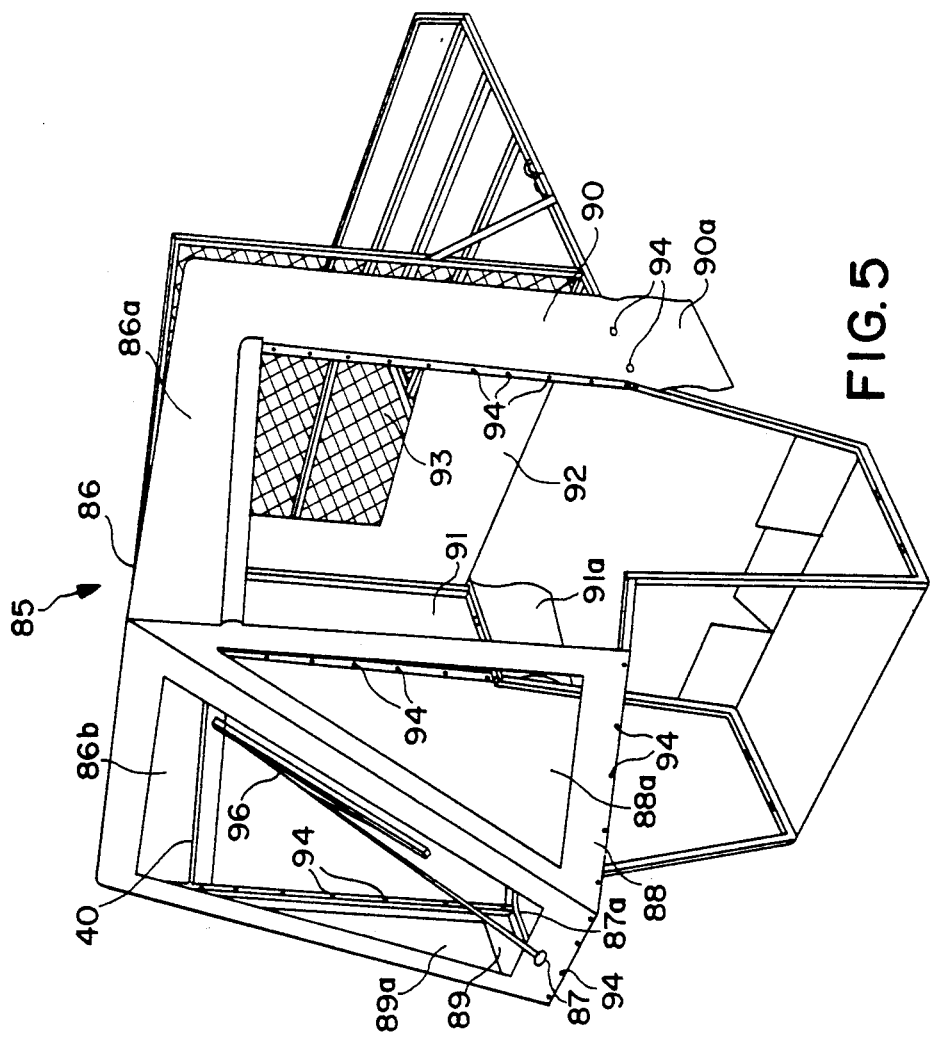

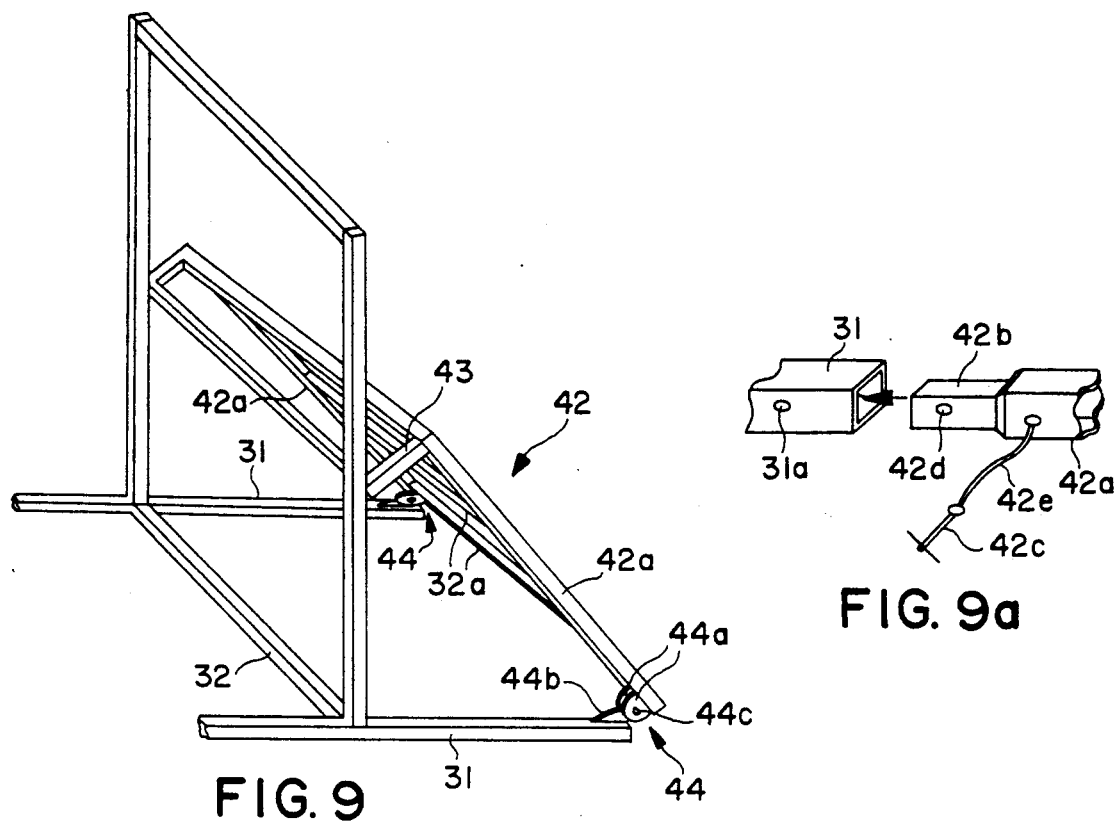
FIG. 9
FIG. 9a
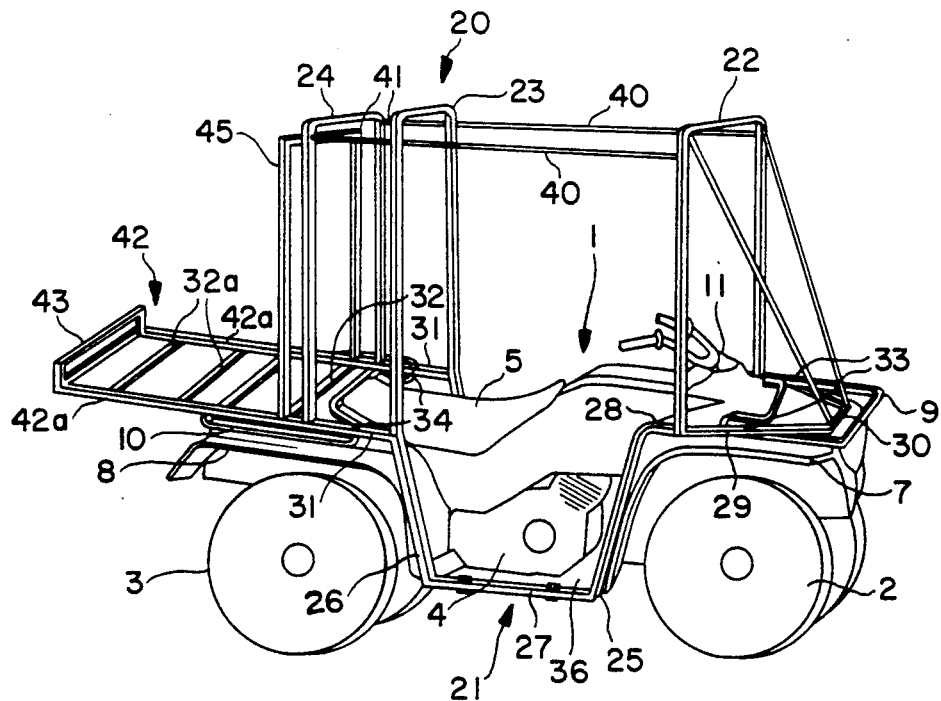
FIG. 10

5,174,622

COMBINATION ROLL CAGE AND COVER FOR ALL-TERRAIN VEHICLES

FIELD OF THE INVENTION

This invention relates to an accessory item for attachment to an all-terrain vehicle (ATV) which provides protection and comfort for the rider as well as a means for carrying items of cargo. The invention is particularly directed to a framework and cover combination which is removably attachable to an ATV to provide a protective and comfortable enclosure for the rider.

BACKGROUND OF THE INVENTION

All-terrain vehicles have become increasingly popular in recent years as recreational vehicles and are now also being recognized as utility vehicles in some instances. Particularly popular are the four wheeled types which are available in both two and four-wheel drive models. Recent litigation and legislation has effectively banned the three wheeled or tricycle type vehicles.

The four wheeled all-terrain vehicles, or ATV's, resemble a four wheeled motorcycle and have two wheels front and rear with transmission and drive train elements connecting a centrally mounted motor to at least the rear wheels. In the four-wheel drive versions, transmission and drive train elements provide power to both the front and rear wheels. A body shell, usually made of fiberglass, covers the subframe and running gear of the vehicle and has a seat area for the rider straddling the motor as on a motorcycle. The body shell spreads laterally front and rear to provide integral fenders at least partially covering the front and rear wheels. In most cases front and rear carrier racks are disposed over the front and rear portions of the body shell with supports therefor passing through o around the ends of the body shell to attach the racks to the subframe of the ATV.

Inasmuch as vehicles of this type were developed from motorcycles, the provisions for rider protection and comfort are minimal to non-existent. Also, cargo carrying capacity is limited to the usually rather small carrier racks provided.

On the latter issue, auxiliary carrying racks have been proposed, notably for the three wheeled ATV's which are no longer marketed in the United States and which usually did not have cargo racks originally provided. Such rack additions are represented by U.S. Pat. No. 4,247,030 to Amacker, and by U.S. Pat. No. 4,277,088 to McCleary. These racks mount directly to the subframe of their respective vehicles.

Additionally, removable tops have also been proposed for ATV's and similar vehicles, such as golf carts, as exemplified by U.S. Pat. No. 4,336,964, to Pivar, U.S. Pat. No. 4,621,859, Spicher, and U.S. Pat. No. 4,950,017, Norton.

Pivar discloses a lightweight canopy for a three wheeled vehicle having a low center of gravity. The canopy provides shelter for the riders and is designed to avoid affecting the vehicle's center of gravity. In this respect, the canopy comprises a framework formed from a pair of U-shaped structures of bent lightweight steel tubing joined by perpendicular spacing elements. The framework has an inherent flexibility which is used to attach the canopy to the vehicle and to provide tension to a thin guage vinyl windshield attachable thereto. Although including lightweight removable doors, the canopy of this patent does not provide a complete enclosure for the riders nor does it make any provision for cargo carrying capability beyond that of the vehicle which is restricted by the canopy framework. At best the canopy provides a limited protection from the elements.

Spicher discloses a weathershield for a golf cart which comprises a pipe frame mounted to the golf cart and a cover of a water repellent flexible material. The frame comprises front and rear pairs of upright support pipe members attached to the golf cart and supporting a roof defined by front, back and side pipes. Doors comprising a pipe frame and a second sheet of waterproof material are also provided. The weathershield of this patent provides no additional cargo carrying capacity beyond that of the golf cart to which it is attached.

Norton discloses a kit for a removable top for all-terrain vehicles of the four wheeled type which comprises rear mounted upright supports and a forwardly extending horizontal support bow to which are attached a fabric top. The top provides overhead coverage and a windscreen only, with the support member's inherent tendency toward separation providing tension to keep the fabric taut. This top kit provides no side protection to riders nor, due to its lightweight construction and the lack of attached forward support members, can it be considered to offer any rollover protection. In addition, the kit fails to augment the limited cargo capacity of such vehicles which is further limited by the position of the support bows of the kit.

Since all-terrain vehicles of the type described above are seeing increased use as both recreational and utility vehicles and in all seasons of the year, there is a distinct need for an accessory device which can provide the necessary level of protection required by all users whether recreational or utility. There is also a distinct need for a device which permits the ATV to be used year round in all types of weather and which maintains a certain level of comfort for the rider. Indeed, such levels of protection and comfort may well be required for employees in some industries which could advantageously use ATV's but don't because the vehicles do not meet insurance requirements or government standards for safety due to the lack of necessary protection. To date the prior art has failed to meet these needs and provide an effective and convenient means for rendering these vehicles safe and comfortable for all types of recreational and non-recreational use.

The present invention provides a removable framework and cover for an all-terrain vehicle which overcomes the deficiencies of the prior art and which provides protection to the rider from the elements, from road hazards and from overturning. In addition, a preferred embodiment augments the carrying capacity of the ATV by providing a foldable cargo rack. The overall result of the present invention is to improve the safety and comfort of the rider and the utility of the vehicle beyond its original recreational capabilities. None of the prior art teach or suggest an attachment for ATV's of the type presented herein or the increased safety and utility benefits afforded by such a device.

SUMMARY OF THE INVENTION

The present invention relates to a protective cage-like frame construction which is easily mounted to or removed from a four wheeled all-terrain vehicle. In one embodiment, the frame is combined with an under pan and an over cover together with removable doors which, in combination with the frame, form an enclosure within which a rider and passenger may be accommodated while operating the ATV. The frame provides rollover protection and support for the cover which, itself, affords protection from flying debris as well as heat retention for rider comfort in cold weather. The under pan provides added protection to both the rider and the motor of the vehicle from ground hazards and material such as dirt and gravel kicked up by the front wheels of the vehicle. In addition, since the frame is attached to and encloses part of the existing carrier racks of the vehicle, it may have, extending rearwardly therefrom, a foldable rack which increases the cargo carrying capacity for large items even when the top is attached to the vehicle. Furthermore, the frame is self supporting and is not dependent on the cover for securement to the vehicle and can therefor be used independently of the cover as a rollover protection cage and cargo rack.

An alternative embodiment provides an abbreviated frame and cover designed more for recreational use while still providing front and overhead protection from the elements and flying debris yet of sufficient strength and rigidity to serve as a protective rollover cage.

It is therefor an object of the present invention to provide a means for increasing the safety of riders on all-terrain vehicles.

It is a further object to provide a means to improve the utility of ATV's beyond their merely recreational value.

It is a still further object to provide a rollover protection means for ATV's which is easily attached to and removable from such vehicles.

And it is a still further object to provide a removable protective cab for small all-terrain vehicles which provides protection for the rider from the elements and road hazards and which includes means for carrying cargo.

Further objects and advantages will be evident from the following drawings and description.

BRIEF DESCRIPTION OF THE DRAWINGS

FIG. 1 is an isometric view of the basic frame of a preferred embodiment of the present invention.

FIG. 2 is an isometric view of an alternative frame embodiment of the present invention.

FIG. 5 is an isometric view of the frame of FIG. 1 with the cover installed.

FIG. 6 is an isometric view of the frame of FIG. 2 with the cover installed.

FIG. 9 is a detail of the rack portion of the frame of FIG. 1 shown in its folded position.

FIG. 9A is a detail view of an alternative means for attachment of a rack to the frame of FIG. 1.

FIG. 10 is an isometric view of an ATV with the frame of FIG. 1 installed.

DETAILED DESCRIPTION OF THE INVENTION

Figure 4:
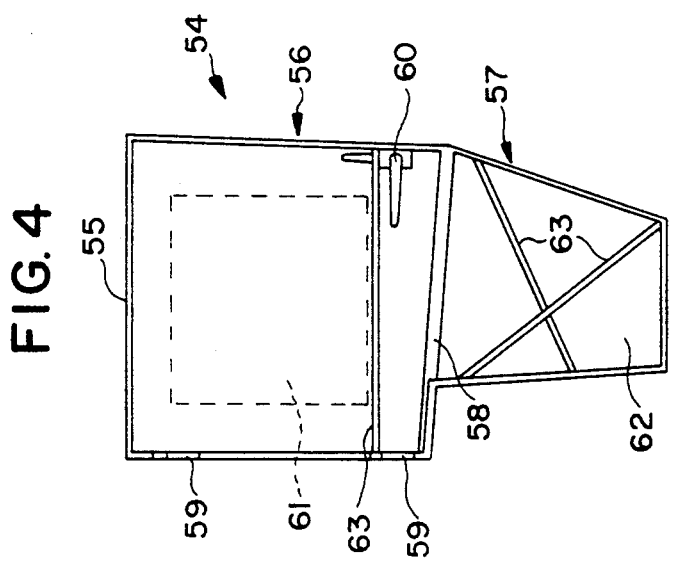
FIG. 4 is a planar view of a door frame for use with the embodiment of FIGS. 1 and 3.

An all-terrain vehicle (ATV) 1 is shown in FIG. 10 with the preferred embodiment of the top frame 20 of the present invention installed thereon. The ATV 1 depicted in FIG. 10 is of the conventional four wheeled type and may represent either a two wheel drive or a four wheel drive version. The ATV 1 includes front wheels 2 and rear wheels 3 between which are the motor 4 and seat 5. The body of the ATV 1 flares out at the front and rear to form front and rear fenders 7 and 8 over which are mounted front and rear carrier racks 9 and 10. Front fenders 7 provide upper and rearward coverage of the front wheels 2 while rear fenders 8 provide upper and forward coverage of rear wheels 3. In this manner there is a narrowed space of the vehicle body between the front and rear wheels which corresponds to the location of the motor 4 and seat 5. A handle bar assembly 11 is located forward of the seat 5 and includes the normal steering, throttle, brake and other control means normal to the type of vehicle. Front and rear racks 9 and 10 are a normal part of the ATV 1 and provide attachment points for the frame 20 of the invention to the ATV 1.

The basic frame 20 of the present invention is shown more clearly in FIG. 1 and comprises a lower frame portion 21 and first, second and third overhead bows 22, 23 and 24. A variety of materials may be used for the construction of frame 20 including solid and tubular stock. However, since the frame 20 is intended to provide both support for a cover and rollover protection to a rider, it is preferred that the material used be 1 to 1½ inch square steel tubing with a heavy gauge wall, preferably ⅛ to ¼ inch thickness. Lower frame portion 21 is a substantially continuous loop constructed to fit over the ATV 1 so as to be supported by the front and rear carrier racks 9 and 10 and comprises front loop 21a, rear loop 21b and intermediate depending portions 21c and 21d on either side corresponding to the space between the front and rear fenders 7 and 8. These depending portions 21c and 21d, one on each side, are substantially trapezoidal in shape and identical and are formed from front and rear bars 25 and 26 depending respectively from the ends of front loop 21a and rear loop 21b of lower frame portion 21. The angles of bars 25 and 26 relative to the horizontal plane correspond to the downward angles of the respective portions of the front and rear fenders 7 and 8 such that when the frame is in place on the ATV 1, as shown in FIG. 10, the front bars 25 will lay against the rearward surface of front fenders 7 and rear bars 26 will lay against the forward surface of rear fenders 8. Bars 25 and 26 extend downward to a point just even with the lowermost portion of the motor 4 and are joined front to rear by horizontal bars 27. In this manner the depending portions 21c and 21d of lower frame portion 21 form what amounts to lower door frames at the point of entry for a rider.

Front loop 21a of lower frame portion 21 extends horizontally forward from the upper ends of bars 25 and around the forward area of the ATV in front of the handle bar assembly 11. Loop 21a is preferably angled inward on both sides as shown in FIG. 1 forming a truncated triangular shape. In the embodiment shown, loop 21a comprises relatively short bars 28 extending forward from the upper ends of bars 25 and from which bars 29 extend forwardly and angle inwardly a distance preferably corresponding to the forward edge of the body of ATV 1. While the forward ends of bars 29 may converge, it is preferred that they be separated and joined by front transverse bar 30 to provide a flat front to the frame 20.

Rear loop 21b is substantially rectangular and extends rearwardly around the rear end of seat 5. In the preferred embodiment, loop 21b comprises bars 31 extending rearwardly from the upper ends of bars 26 to a point preferably just rearward of the rear end of seat 5 where the ends of bars 31 are joined by rear transverse bar 32.

Since front and rear loops 21a and 21b of lower frame portion 21 overlie the front and rear carrier racks 9 and 10 of ATV 1, they are provided with means to attach to the racks. Preferably, attachment is achieved simply with four sets of threaded nuts and bolts, two each front and rear 33 and 34. To accommodate this attachment means, corresponding holes 35 are drilled in the front loop angled bars 29 and in front rack 9 as well as in rear loop bars 31 and rear rack 10. Since racks 9 and 10 are themselves securely mounted to the subframe of ATV 1, it has been found that four bolts are sufficient to secure frame 20 the ATV 1. However, additional bolts may be used if needed simply by drilling additional corresponding holes.

Although the lower frame portion 21 may be constructed from individual pieces of stock welded together at the meeting points of the different bars, it is preferred that it be fabricated from two pieces of stock bent to the appropriate shape. Thus, the forward section of lower frame portion 20 comprising front loop 21a and front depending bars 25 is preferably one piece of stock while the rearward section comprising rear loop 21b, rear depending bars 26 and horizontal bars 27 is preferably one piece of stock. After bending to the appropriate configuration, the two sections are welded together at the meeting points of the front ends of the horizontal bars 27 and the lower ends of front depending rods 25 to form the complete lower frame portion 21.

The preferred embodiment of this invention also comprises a lower protection means in the form of an under pan 36 which fits beneath the motor 4 of ATV 1 and extends transversely between horizontal bars 27 of depending portions 21c and 21d of lower frame portion 21. Under pan 36 provides protection to both the motor 4 and the rider by deflecting ground hazards and material thrown up by the front wheels. To attach under pan 36 to frame 20, horizontal bars 27 and the outer ends of under pan 36 are provided with corresponding bolt holes so that threaded nut and bolt sets 27a may be used therewith. Under pan 36 is preferably not directly attached to any part of ATV 1 thereby rendering frame 20 easily mounted to or removed from the vehicle. Instead, as noted previously, front and rear depending bars 25 and 26 extend downward to a point just even with the lowermost point of motor 4 such that, when frame 20 is mounted to the vehicle and under pan 36 is bolted to bars 27, the upper surface of under pan 36 will butt against the under side of motor 4 effectively clamping ATV 1 between front and rear frame loops 21a and 21b and under pan 36 when all mounting bolts are tightened. The rear edge of under pan 36 is bent upwards along a line corresponding to the connection point between the rear depending bars 26 and horizontal bars 27 forming an upwardly extending flap 37. The center section 38 of flap 37 is separated from the rest of flap 37 and bent at a shallower angle to accommodate portions of the ATV drive train extending rearward from motor 4.

As noted previously, the upper portion of frame 20 is defined by first, second and third overhead bows 22, 23 and 24. These bows are preferably each formed from one piece of stock bent at two places to form the rectangular U-shape shown; however, they may also be fabricated from individual pieces welded together. Bows 22, 23 and 24 provide overhead protection as well as forming the upper portion of the rollover cage of frame 20. Each bow 22, 23 and 24 comprises a pair of upstanding support legs, 22a, 22b, 23a, 23b, 24a, 24b, welded to lower frame portion 21 at their respective lower ends, and a transverse bar 22c, 23c, 24c, connecting the upper ends of the support legs overhead of the rider. Front bow 22 is welded to lower frame 21 at the point where front loop bars 28 and 29 meet. Forward stays 39 extend forwardly and downward between the ends of transverse bar 22c and the ends of transverse bar 30 providing rigidifying support to front bow 22 and forming a trapezoidally shaped flat front to frame 20. Mid bow 23 is welded to lower frame portion 21 at the point where bars 26 and 31 meet and rear bow 24 is welded to lower frame portion 21 at or immediately in front of the point where transverse bar 32 joins the ends of bars 31. To provide added stability between bows 22, 23 and 24, and increased rigidity to the frame, front to rear stabilizer rods 40, 41 are welded between the corresponding legs of bows 22, 23 and 24 at or just below their upper corners. The preferred location is just below the corners as shown in FIG. 1 where the stabilizer rods 40 between front bow 22 and mid bow 23 will also form the upper lintels of door frames. Stabilizer rods may be made from the same stock as the rest of the frame but are preferably ¼ to ½ inch steel rod.

As shown in FIG. 10, the frame 20 of the preferred embodiment attaches to the ATV 1 such that the majority of the rear carrier rack 10 is still accessible. However, inasmuch as one object of this invention is to increase the utility of a recreational vehicle, the preferred embodiment includes an extended rear rack 42. This rear rack 42 provides an extended carrying capacity for the ATV and comprises extensions of the rear loop bars 31 beyond transverse bar 32 forming rack frame 42a and additional transverse support bars 32a. The rear end of rack 42 may be provided with an upturned lip 43. Rack 42 may be a continuous extension of lower frame 21 as shown in FIG. 10 but it is preferably fabricated as a separate unit and attached to extended portions of bars 31 by a hinge means 44 permitting the rack to be folded upward when not in use as in FIG. 9.

The hinge means 44 may be any type having sufficient strength to support both the rack and any cargo to be carried thereon. One form is that shown in FIG. 9, preferably fabricated from steel plate and a heavy duty bolt and comprising a pair of parallel semicircular plates 44a welded to the forward ends of rack frame members 42a and single elongated plates 44b welded to the rear ends of extended bars 31 to extend beyond the ends of bars 31 and be received between plates 44a. Holes drilled through plates 44a and 44b allow the insertion of heavy duty bolts 44c to function as hinge pins. By positioning plates 44b to extend beyond the ends of bars 31 and between plates 44a, when rack 42 is opened the forward ends of rack frame members 42a will butt against the rearward ends of extended bars 31 thereby preventing rack 42 from sagging downward.

In an alternative embodiment, shown in FIG. 9A, rack 42 may be removable, its attachment to the ends of bars 31 being by means of a reduced portion 42b of the ends of rack frame members 42a allowing them to telescope into the ends of bars 31. To prevent against inadvertent removal, latch pins 42c may be inserted through holes 31a and 42d drilled through the respective bars so as to be in registration when the rack is properly positioned. To prevent loss, the latch pins 42c may be attached to either bar 31 or rack frame member 42a by means of a cable or chain 42e.

When including a rack 42, frame 20 is also provided with a protective screen 45 between the rack and the rear bow 24 to both hold cargo placed on rack 42 and prevent it from shifting forward into the rider area within the frame 20. Screen 45 preferably comprises a bow like front, mid and rear bows 22, 23 and 24 and having two upstanding legs 45a and 45b, welded to lower frame bars 31 rearward of legs 24a and 24b of rear bow 24, and a transverse bar 45c between the upper ends of legs 45a and 45b. In addition a second transverse bar 45d may be welded between the legs about half way up from lower frame 21. The area bounded by legs 45a, 45b and transverse bar 45c is covered by a screen material such as expanded metal mesh 46. Support stays 47 are welded between the legs 45a and 45b and the rear ends of lower frame bars 31 to further strengthen screen 45. Stays 47 may be flat steel bars cut to the appropriate length.

Alternatively, the rack 42 and screen 45 may be a separate unit attachable to and removable from the main frame structure by a means such as that shown in FIG. 9A. In such a case it would be preferred that rear loop bars 31 end just rearward of rear bow 24 and that transverse bar 32 be positioned in the same plane as rear bow 24. A second transverse bar would be welded between the rack frame members 42a in the plane of screen 45 to give the separate rack rigidity.

Figure 3:
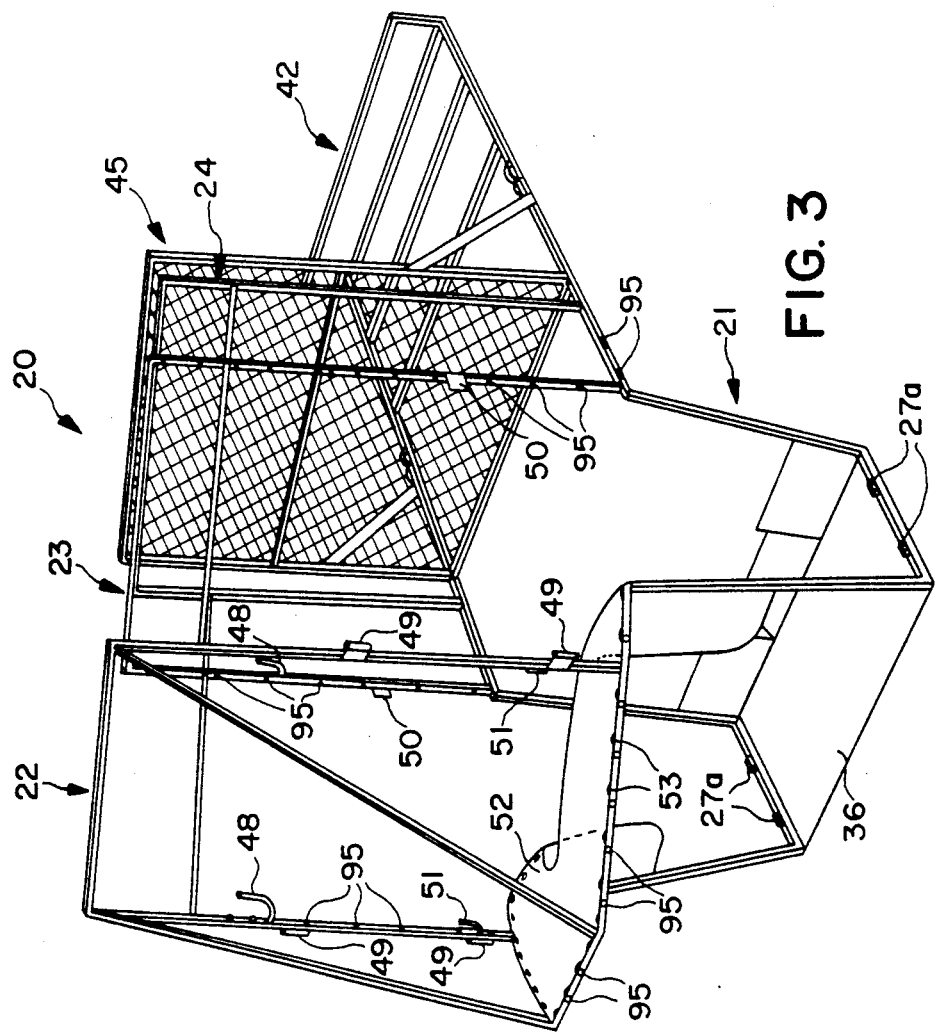
FIG. 3 is an isometric view of the embodiment of FIG. 1 including additional hardware elements.

Turning to FIG. 3, the frame of FIG. 1 is illustrated with additional elements in place. These elements include clips or hooks 48 attached to the legs 22b and 23b of front and mid bows 22 and 23. These clips or hooks 48 may be used to support a variety of items including hunters' weapons, workers' tools, or the like. For supporting long items, such as a rifle, it will be preferable to mount two clips 48 at the same height on each leg 22b and 23b or legs 22a and 23a. More than one set of clips or hooks 48 may be provided and on more than one side of the frame Also attached to the legs 22a and 22b of front bow 22 are hinge elements 49 for doors to be used in combination with the frame 20. These hinge elements 49 may be any appropriate type but are preferably simply a steel tube having a flange for welding to the outside of each leg; two hinge elements 49 upper and lower are provided on each leg 22a and 22b. The tubes are arranged vertically so as to receive downwardly extending pins which are part of the doors to be described later. On the legs 23a and 23b of mid bow 23 are latch plates 50 which will cooperate with latch handles on the doors. The latch plates in their simplest form are merely plates welded to the legs 23a and 23b for the latch handles to engage. Other types of latch means may also be used. Associated with the lower hinge element 49 on each leg 22a and 22b is a hook 51 which serves as an attachment point for one end of a stay strap, the other end of which is attached to the inner surface of the door, and which limits the travel of the door about its hinges.

Within the area bounded by the forward portion of lower frame portion 21, particularly around the area of front loop 21a, is a draft blanket 52 which lays over the front portion of the ATV 1 when the frame is mounted thereto to provide a flexible seal between the ATV 1 and the inside of the frame 20. In so doing, the blanket 52 prevents debris and other material from entering the rider compartment. Blanket 52 is preferably a heavyweight flexible material such as rubberized canvas and is attached to the upper surfaces of lower frame members 28, 29 and 30 by means of fastening elements 53 such as screws, heavy duty snaps or loop fasteners; screws or heavy duty snap fasteners such as those used on automobile convertible tops are preferred. The ends of the blanket 52 continue downward along front bars 25 to lay over the rearward surfaces of the front fenders 7.

FIG. 4 illustrates the door 54 to be used with frame 20 of FIGS. 1 and 3. Door 54 comprises a frame 55 of ¼ to ½ inch steel rod bent and welded to the shape and dimensions of the space defined by the legs of front and mid frame bows 22 and 23, stabilizer rods 40 and depending portions 21c of frame 20. In this manner door 54 comprises an upper, substantially rectangular portion 56 and a lower, substantially trapezoidal portion 57. A steel strengthening bar 58 provides strength to the door 54 and a general division between the two portions. Along the forward edge of the upper portion 56 are upper and lower hinge pins 59 which comprise downwardly extending pieces of rod welded or otherwise attached to the door frame 55 at points thereon coinciding with the location of hinge elements 49 on frame 20. As mentioned previously, these pins 59 fit into and cooperate with the tubes of hinge elements 49 on front bow legs 22a and 22b allowing the doors 54 to be easily lifted on to or off of the frame 20. Opposite the lower hinge pin 59 on door 54 is latch handle 60 having means to cooperate with latch plates 50 on legs 23a and 23b when the doors 54 are mounted on frame 20 and closed. The upper portions 56 of doors 54 are preferably covered with a heavy duty canvas such as that used for automobile convertible tops and which is provided with a window 61 of heavy duty transparent plastic material bonded to the canvas in the normal manner. In contrast, the lower portions 57 of doors 54 are covered with sheet metal panels 62 to provide protection to the rider's legs from debris or road hazards. The sheet metal panels 62 may be clipped, welded or otherwise attached to the door frame 55, preferably in a manner to prevent their inadvertent removal. Stiffening members or cross braces 63 may also be provided to add rigidity to the door frame 55.

An alternative frame structure 70 providing frontal and overhead protection, but without the provision for the total enclosure of frame 20, is illustrated in FIG. 2. This frame 70 has a front section 70a, similar to that of frame 20, and a roof section 70b. Front section 70a comprises an overhead bow 71 having upstanding legs 71a and 71b with a transverse joining bar 71c at the upper ends. As with bows 22, 23 and 24 of frame 20, bow 71 may be fabricated from individual pieces welded together but is preferably made from a single length of stock bent to shape. The lower ends of legs 71a and 71b are welded to a front loop 72 having the same construction as front loop 21a of frame 20; that is, forwardly extending bars 73, inwardly angled bars 74 and front transverse bar 75. As with bow 71, front loop 72 may be fabricated from individual pieces of stock welded together but is preferably made from a single length of stock bent to shape. Extending upward and rearward from front loop 72 at the points of connection between bars 73 and 74 and bars 74 and transverse bar 75 to the respective corners of bow 71 are front stays 76 which may be of the same square stock as the main elements of frame 70 but are preferably ¼ to ½ inch steel rods welded in place to provide forward support for a cover and rigidity to the front section 70a of frame 70.

Roof portion 70b comprises side bars 77 welded to and extending rearwardly from the upper portions of legs 71a and 71b. The rearward ends of side bars 77 are joined by a transverse bar 78 and by a shortened rear bow 79. Side bars 77 are attached to legs 71a and 71b at a point just below the transition between legs 71a and 71b and transverse bar 71c and rear bow 79 has the same height as that distance from side bars 77 to the top of transverse bar 71c. Front to rear stabilizer bars 80 are welded between the corners of front bow 71 and rear bow 79. Depending downward from side bars 77 are rear support legs 81, the lower ends of which are provided with means to attach to the rear carrier rack 10 of ATV 1. As with frame 20, front loop 72 of frame 70 is provided with means for attachment to the front carrier rack 9 of ATV 1. Preferably the attachment means is like that of frame 20, threaded nuts and bolts inserted through corresponding holes in the front loop 72 and front rack 9 and in the attachment means 82 of rear support legs 81 and rear rack 10. The attachment means 82 of rear legs 81 preferably comprises steel plates 83 welded to the ends of legs 81 and having the requisite bolt holes drilled therein. Hook portions 84 may be provided at one end to catch the rear carrier rack 10 therein for added security. The length of roof portion 70b is sufficient to provide coverage for the entire seat 5 of ATV 1 and preferably at least part of the rear rack 10. A draft blanket similar to blanket 52 of frame 20 may be attached to the front loop 72 of frame 70 for the same purpose as that provided with frame 20.

In the case of both frame 20 and frame 70, the structures may be used as so far described simply by mounting them to the ATV 1. In such use the frames will provide rollover protection to the occupants of the ATV in the manner of a roll cage. The frames 20 and 70 also provide cargo carrying means in that items may be carried on rack 42 of frame 20 and overhead on the transverse bars of bows 22, 23 and 24 of frame 20 and bows 71 and 79 of frame 70. The strength and rigidity of the frames permits long items to be secured to the frames above the rider in a front to rear orientation. Furthermore, the angled front stays 39 of frame 20 and 76 of frame 70 provide a means to deflect low hanging branches or the like upward and away from the rider.

Figure 7:
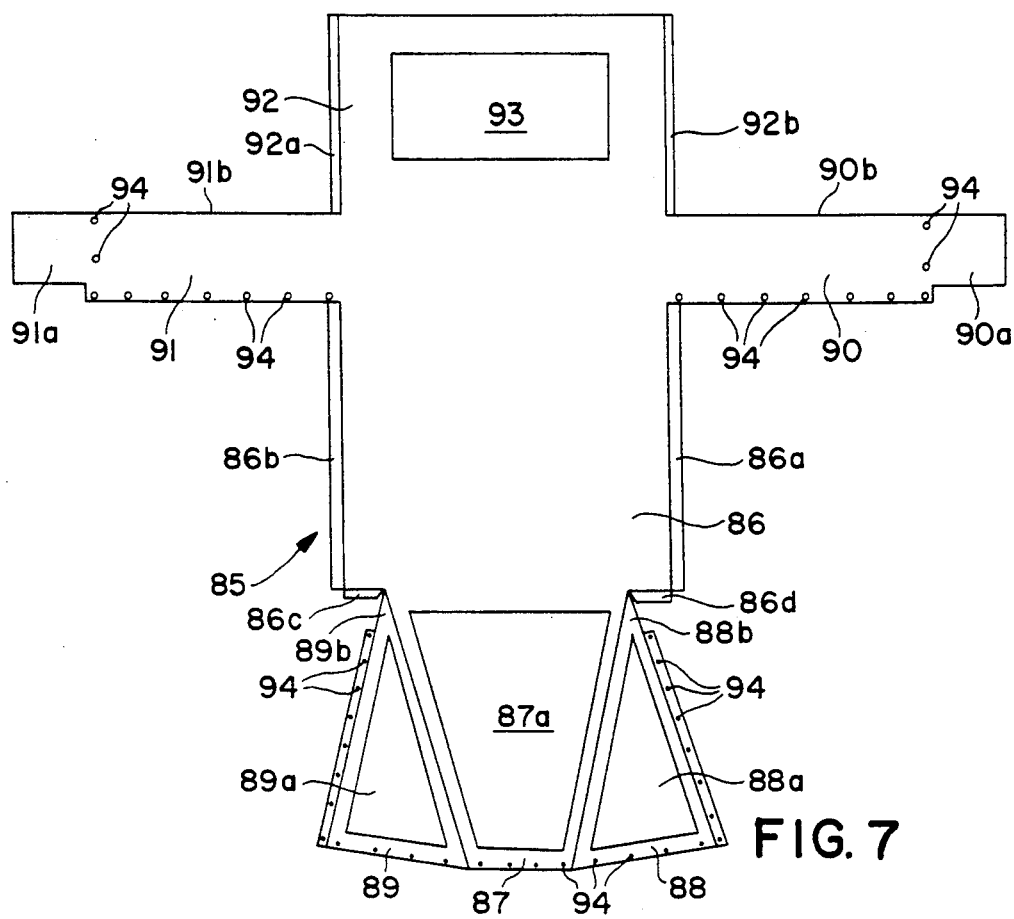
FIG. 7 is a planar view of the cover employed with the frame of FIG. 1.
Figure 8:
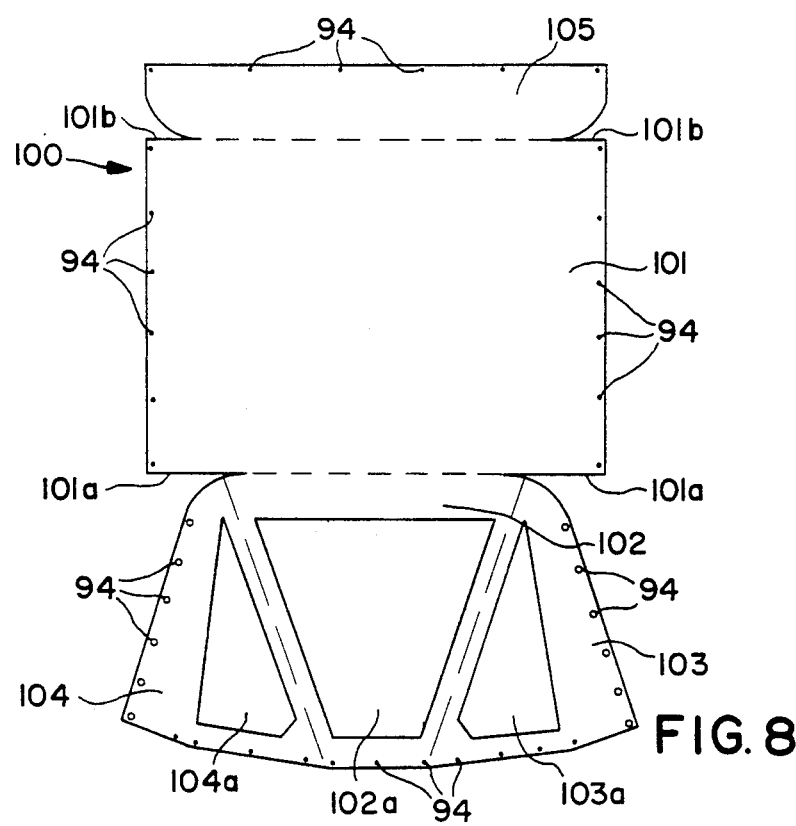
FIG. 8 is a planar view of the cover employed with the frame of FIG. 2.

However, it is also an object of this invention to provide protection to users of ATV's from the elements such as wind, rain, snow and the like, and toward this end frames 20 and 70 are also designed to accept covers of canvas or other suitable material; as with doors 54, automobile convertible top material is preferred. FIGS. 5 and 6 illustrate frames 20 and 70, respectively, with such covers in place and FIGS. 7 and 8 illustrate the covers themselves in plan view before being sewn or bonded into their final shapes.

As shown in FIG. 5, when cover 85 for use with frame 20 is in place, a substantially completely enclosed cab is provided on the ATV. Cover 85 comprises a roof 86, front, left and right side windshields 87, 88 and 89 having windows 87a, 88a and 89a therein, and left, right and rear curtains 90, 91 and 92. Rear curtain 92 includes a window 93, centrally located therein, affording the rider a rearward field of vision. As with window 61 in door 54, window 93 in rear curtain 92 is preferably a heavy duty, flexible, transparent plastic material such as that commonly used in automobile convertible tops. Front, left and right side windows 87a, 88a and 89a may be of a similar material or they may be of a rigid transparent material such as polycarbonate resin or even safety glass set into apertures cut in the cover material and sewn, glued or otherwise bonded to the cover material so as to provide leakproof attachment of the window material to the cover material. The individual windows in front, left and right side windscreens 87, 88 and 89 are separated by portions of cover material which will overlay front stays 39 of frame 20 when cover 85 is in place. In addition, a perimeter of cover material is provided about the sides and lower edges of the windows.

In an alternative embodiment, front window 87a is made of rigid material while left and right side windows 88a and 89a are of the heavy duty flexible material and an electrically driven oscillating wiping element 96 is provided for front window 87a. The motor for the wiping element 96 will derive its power from the ATV by means of an auxiliary plug present on the ATV. In such an embodiment, the wiping element 96 will preferably be mounted on a plate attached either to the transverse bar 22c of front bow 22 or to the transverse bar 30 of front loop 21a with the arm of wiping element 96 extending through front windshield 87 and either downward or upward over window 87a. One such arrangement is illustrated in FIG. 5.

As also seen in FIG. 5, portions 86a and 86b of roof 86 extend downward above door openings over stabilizer bars 40 and left and right curtains 90 and 91 continue downward from roof 86 to rear loop bars 31 over legs 23a, 24a, and 23b, 24b of mid and rear bows 23 and 24. The lower edges of portions 86a and 86b are not attached and will cooperate with the upper edges of doors 54 when they are mounted and closed to provide a seal therewith. In addition, the lower ends 90a and 91a of left and right curtains 90 and 91 are free to hang down below rear loop bars 31 and may be tucked under bars 31 between them and the ATV as a further weather seal. Rear curtain 92 covers the entire area between the legs of rear bow 24. Attachment of cover 85 to frame 20 is by means of screws or heavy duty snap fasteners such as those used with automobile convertible tops, the fastening points being provided along the lower edges of front, right and left windshields 87, 88 and 89, upward along the rearward edges of right and left windshields 88 and 89 upward along the front edges of left and right side curtains 90 and 91 and along rearwardly extending frame bars 31 where left and right side curtains 90 and 91 pass thereover. When screws are used, the fastening points in the cover are preferably reinforced with grommets. Corresponding holes or snap fastener halves 95 are provided along the front of bars 29 and 30, along the inside faces of front bow legs 22a and 22b, along the forward faces of mid bow legs 23a and 23b and along the outer faces of rearwardly extending bars 31 as shown in FIGS. 1 and 3.

In FIG. 6, alternative frame 70 is provided with a cover 100 of the same or similar material as cover 85. Like cover 85, cover 100 for frame 70 has a roof 101 and front, left and right side windshields 102, 103 and 104, each of which is provided with a transparent window 102a, 103a and 104a. However, since frame 70 is of abbreviated construction, there are no left or right side and rear curtains. Cover 100 attaches to frame 70 in the same manner as cover 85 to frame 20 by means of screws or heavy duty snap fasteners 94 around the perimeter thereof to legs 71a and 71b, bars 73, 74 and 75 and to side bars 77 and rear transverse bar 78. As with frame 20, corresponding holes or snap fastener halves 95 are provided on those frame members and, when screws are used, the points of attachment along the cover edges are reinforced with grommets. Also, windows 102a, 103a and 104a are positioned such that they lay between front support stays 76, these stays providing support for the cover fabric. As with cover 85, the windows of cover 100 may be flexible or rigid transparent material and will be bonded to the cover material in a manner appropriate to the specific materials used.

Covers 85 and 100 may be cut from a single piece of cover material as shown in FIGS. 7 and 8 in which case they will be sewn or bonded along particular edges to form the three dimensional shapes for fitting over their respective frames. In the case of cover 85 in FIG. 7 edge 91b of right side curtain 91 will be sewn or bonded to corresponding edge 92a of rear curtain and edge 90b of left side curtain will be sewn or bonded to corresponding edge 92b of rear curtain 92. Preferably, edges 92a and 92b are provided with extra flanges of material as shown to accommodate attachment to side curtains 90 and 91. In a similar manner, the right front edge 86c of roof 86 will be sewn or bonded to the upper edge portion 89b of right windshield 89 while the left front edge 86d of roof 86 will be sewn or bonded to the upper edge portion 88b of left windshield 88. Similar extra flanges of material are provided along edges 86c and 86d for this purpose. Similarly, looking at cover 100 in FIG. 8, front and rear edges 101a and 101b will be sewn or bonded to corresponding edges of left and right windshields 103 and 104 at the top edges thereof and to corresponding edges of rear bow cover portion 105 to form the three dimensional structure of cover 100 which will fit over and attach to frame 70. All sewn or bonded seams of covers 85 and 100 are preferably reinforced with extra thicknesses of cover material and all stress or wear points, such as where the cover is stretched over a corner or stay of the frames are similarly reinforced.

To apply the covers to their respective frames, they are merely placed over the frame and the front, back and sides pulled downward thereover. The appropriate edges are then affixed to the frame either by inserting screws through the appropriate locations or by pressing the halves of snap fasteners together. Removal is merely the reverse comprising separation of the snap halves or removal of the screws and pulling up of the front, back and sides of the cover until it is free from the frame.

Thus, in the case of frame 20 and its associated cover 85, it is seen that the present invention provides a means for equipping an ATV with a full roll cage protective structure, auxiliary cargo carrying capacity and full protection for the rider from the elements and road hazards. This embodiment also renders the vehicle fully useable in cold weather since the combination of the full cover 85, doors 54 and draft blanket 52 tend to retain the heat generated by motor 4 of the ATV 1 within the enclosure occupied by the rider. Accordingly, this embodiment effectively converts a recreational ATV into a fully useable, year round utility vehicle. On the other hand, frame 70 and its associated cover 100 retain the recreational nature of the vehicle while still providing roll over protection and some elemental protection for recreational users or utility users who don't need the full cage structure.

While the invention has been described in connection with what are presently considered to be the most practical and preferred embodiments, it is to be understood that the invention is not to be limited to these disclosed embodiments, but on the contrary, is intended to cover various modifications and equivalent arrangements included within the spirit and scope of the appended claims.

What is claimed is:

1. A combination metal roll cage and fabric cover therefor for an all-terrain vehicle wherein said all-terrain vehicle comprises a forward portion having a front deck, front wheels and vehicle control means, a rearward portion having a rear deck and rear wheels and a relatively narrower mid portion having a rider's seat and housing a motor and drive train elements; said combination roll cage and cover comprising:
   a front frame section attachable to said front deck of said vehicle and comprising a front member extending transversely across said front deck ahead of said control means and side members extending rearwardly from the ends of said front member along either side of said forward portion of said vehicle to a point substantially even with the rear edge of said forward portion, a front bow comprising first and second support legs attached to and extending perpendicularly upward from the rearward ends of said side members and a transverse member uniting the upper ends of said legs, and support stays attached to and extending forward and downward from the upper ends of said legs to the ends of said front transverse member;
   a rear frame section attachable to said rear deck of said vehicle and comprising a rear transverse member extending across said rear deck behind said rider's seat and side members extending forwardly from the ends of said rear transverse member to a point substantially even with the front edge of said rear portion of said vehicle, and at least one rear bow comprising first and second support legs attached to and extending perpendicularly upward from said side members and a transverse member uniting the upper ends of said legs over said rider's seat, said front and rear bows being of a height relative to the vehicle sufficient to accommodate a rider seated thereon;
   intermediate frame sections uniting said front and rear frame sections along and on either side of the mid portion of said vehicle into a rigid roll cage;
   a flexible, weatherproof cover fittable over said front frame section, said rear frame section and the intervening overhead area between said front and rear bows and having at least one forward facing transparent window therein; and
   means to removably attach said cover to said roll cage and means to removably attach said roll cage to said vehicle.

2. The combination roll cage and cover of claim 1 wherein said intermediate frame sections comprise front and rear members extending downwardly from said front and rear side members at either end of said mid portion of said vehicle and an intermediate member extending horizontally between the lowermost ends of each pair of said front and rear downwardly extending members, said intermediate frame sections being parallel to the longitudinal axis of said vehicle and extending downward only as far as the lowermost part of said mid portion of said vehicle.

3. The combination roll cage and cover of claim 2 further comprising a rearwardly extending horizontal carrier rack and a vertically extending protective screen positioned rearwardly of said rear frame section and attached thereto.

4. The combination roll cage and cover of claim 3 wherein said rack comprises frame members which are rearward extensions of said rear frame section side members and transverse support members attached to and between said frame members.

5. The combination roll cage and cover of claim 4 wherein said rack frame members include hinge means whereby said rack is foldable upwardly against said protective screen when not in use.

6. The combination roll cage and cover of claim 5 wherein said protective screen comprises upstanding support legs attached to each of said rack frame members adjacent said rear frame section and a transverse top member attached between the upper ends of said support legs, said screen being at least as high as said front and rear bows, and a metal mesh attached to said support legs and top member covering the area bounded by said support legs and top member.

7. The combination roll cage and cover of claim 3 further comprising an under pan of heavy gauge sheet metal positioned beneath said mid portion of said vehicle and attached to said horizontal intermediate members of said intermediate frame sections.

8. The combination roll cage and cover of claim 7 further comprising front and rear stabilizer rods attached to the support legs of said front and rear bows adjacent the transverse members thereof and extending between said front and rear bows parallel to the longitudinal axis of said vehicle.

9. The combination roll cage and cover of claim 8 wherein said front frame section, said rear frame section and said intermediate frame section are fabricated from 1 to 1½ inch square steel tubing having a wall thickness of preferably ⅛ to ¼ inch, said stabilizer rods re ¼ to ½ inch steel rods, said cover is fabricated from a heavy duty, flexible, weatherproof textile, said at least one window is made from a transparent material bondable to said textile and which may be flexible or rigid and the members of said roll cage are welded together to form a rigid structure.

10. The combination roll cage and cover of claim 9 further comprising means on said first and second support legs of said front and rear bows to accommodate doors covering the space between said front and rear frame sections, and doors removably attachable thereto and hingeable thereon, said doors comprising a frame means having upper and lower portions, an upper portion covering preferably of the same material as said cover and having a window therein, and a lower portion covering preferably of sheet metal, said doors further comprising latch means cooperable with said means on said first and second support legs to maintain said doors in a closed position.

11. The combination roll cage and cover of claim 3 wherein said rack and protective screen are a separate unit removably attachable to said roll cage rearwardly of said rear bow by telescopic attachment means.

12. A combination roll cage and cover for an all-terrain vehicle wherein said all-terrain vehicle comprises a forward portion having a front deck, front wheels and vehicle control means, a rearward portion having a rear deck and rear wheels and a relatively narrow mid-portion having a rider's seat and housing a motor and drive train elements; said combination roll cage and cover comprising:
 a front frame section;
 an overhead frame section connected to and extending rearwardly from said front frame section;
 rear support legs depending from said overhead section;
 a flexible weatherproof cover for said front frame section and overhead section;
 at least one forwardly mounted transparent window in said flexible weatherproof cover;
 means to removably attach said cover to said roll cage; and
 means to removable attach said roll cage to said front deck and said rear deck of said vehicle.

13. The combination roll cage and cover of claim 12 wherein said front frame section is attachable to said front deck of said vehicle and comprises a horizontal portion comprising a front transverse member with first and second rearwardly extending side members attached to the ends thereof a vertical portion comprising an upwardly extending bow comprising first and second support legs attached to the rearward ends of said side members and a transverse member attached to said legs between the upper ends thereof, and stabilizer rods extending downwardly and forwardly from the upper corners of said bow to the ends of said front transverse member.

14. The combination roll cage and cover of claim 13 wherein said overhead frame section comprises a pair of side members attached to and extending rearwardly from said first and second support legs of said bow at a point adjacent to and slightly below said transverse member of said bow, a rear transverse member attached to said side members between the rearward ends thereof, and a rear bow extending upward from and transverse to said side members above said rear transverse member, said rear bow having a height equal to the height of said forward transverse member above said side members, and wherein said rear support legs depend from said side members to the rear deck of said vehicle and have means at their lower ends for removable attachment to said rear deck.

15. The combination roll cage and cover of claim 14 wherein said frame members are fabricated from 1 to 1½ inch square steel tubing having a wall thickness of ⅛ to ¼ inch and are welded together to form said cage and wherein said stabilizer rods are fabricated from ¼ to ½ inch steel rod welded to said front frame section.

16. The combination roll cage and cover of claim 15 further comprising an oscillating wiping means for the outer surface of said at least one window.

17. The combination roll cage and cover of claim 10 further comprising an oscillating wiping means for the outer surface of said at least one forward facing window.

18. The combination roll cage and cover of claim 10 further comprising means attached to said first and second legs of said front and rear bows for supporting elongated implements thereon.

19. The combination roll cage and cover of claim 10 wherein said cover comprises a front portion, a roof portion and a rear portion, wherein said front portion comprises a trapezoidal front panel having a wide upper edge and a narrow lower edge and flanked by identical triangular side panels and adapted to fit over and cover said front frame section, the lower edge of said front portion having means to attach to said front and side members of said front frame section and the rearward edges of said triangular panels having means to attach to said first and second legs of said front bow, each of said panels having a correspondingly shaped aperture cut therein in which is mounted a sheet of transparent material, said roof portion comprises a substantially rectangular section adapted to cover the area of said roll cage from said front bow to said rear bow and having side portions extending downward from said rectangular section over said front to rear stabilizer rods, and said rear portion comprises a rear panel extending downward from said roof portion over said rear bow to cover the area of said rear bow and having an aperture cut therein in which is mounted a sheet of transparent material and side curtains extending downward from said roof portion to said rear frame side members and forward from said rear panel a distance toward but separated from rearward edges of said front portion triangular panels, said side curtains having means for attaching to said rear frame side members, said portions being sewn or bonded along adjoining edges to form a three dimensional cover adapted to be placed over and supported by said roll cage.

20. the combination roll cage and cover of claim 15 wherein said cover comprises a front portion and a roof portion, said front portion comprising a trapezoidal panel having a wide upper edge and a narrow lower edge and flanked by identical triangular panels, the lower edge of said trapezoidal panel and the free edges of said flanking triangular panels having means to attach to said horizontal portion and said first and second bow support legs of said front frame section, each panel having a correspondingly shaped aperture cut therein in which are mounted transparent panels, and said roof panel comprises a substantially rectangular panel joined to said front portion along the upper edge thereof and having means to attach to said side and rear transverse members of said overhead frame section, wherein the front portion is adapted to fit over said front frame section of said roll cage and said roof portion is adapted to fit over said overhead frame section of said roll cage.

* * * * *